H. S. CARTER.

FOLDING LOUNGE.

No. 7,685. Reissued May 15, 1877.

WITNESSES:

C. Clarence Poole

Geo. H. Evans

INVENTOR:

Henry S. Carter per attys. A. H. Evans & Co

N. PETERS, PHOTO-LITHOGRAPHER, WASHINGTON, D. C.

UNITED STATES PATENT OFFICE.

HENRY S. CARTER, OF CHICAGO, ILLINOIS.

IMPROVEMENT IN FOLDING LOUNGES.

Specification forming part of Letters Patent No. 156,131, dated October 20, 1874; reissue No. 7,685, dated May 15, 1877; application filed April 27, 1877.

*To all whom it may concern:*

Be it known that I, HENRY S. CARTER, of Chicago, in the county of Cook and State of Illinois, have invented an Improvement in Folding Lounges, of which the following is a specification:

The nature of my invention consists in providing a folding lounge with a swinging bolster, which, when in use, has a proper incline, and when not in use can be swung around without being detached, and will lie flat between the mattresses, as hereinafter described and claimed.

Figure 1:
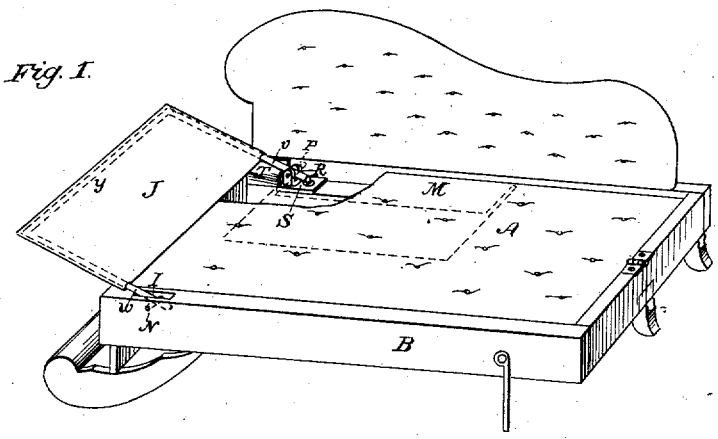
Figure 2:
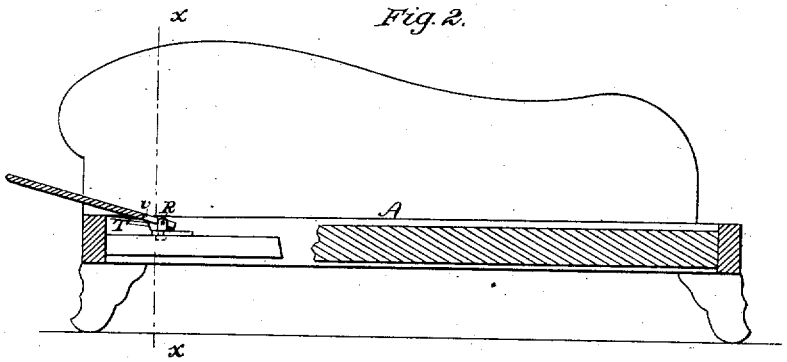
Figure 3:
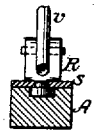
Figure 4:
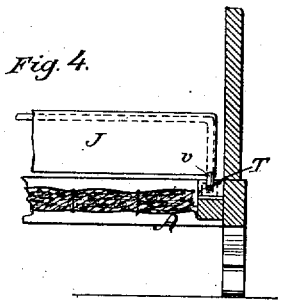

In the drawings, Figure 1 is a perspective representation of a folding lounge provided with my improved bolster; Fig. 2, a longitudinal section of the same; Fig. 3, an elongated view of the swivel-hinge detached from the lounge. Fig. 4 is a section on line X, Fig. 2, showing the cam-support for the inner end of the bolster.

A represents the bottom section of the lounge, and B the folding part, which are constructed in the ordinary manner, to be used as a lounge when closed, and as a bed when the top section is turned over to the front, as in Fig. 1. The bolster A is made of a light bar of iron, bent as shown in Fig. 1, the middle part *y* of which is long enough to extend across the lounge when unfolded, and the ends are bent at right angles to the middle, and the three parts thus formed are then covered with cloth or fabric J, sewed fast in the ordinary manner of doing such work. The inner end *v* of the bolster is jointed or hinged at P to a a hinge-pivot, R, the headed shank of which passes down through a plate, S, fastened to the frame of the lounge so that the pivot will rotate.

Outside of the hinge-pivot R is placed a cam or inclined support, T, upon which the end *v* of the bolster rests when the latter is brought across the sections of the lounge, as shown in Fig. 1, the double joint of the hinge-pivot allowing the bolster to both swing and incline. The outer rail or frame of the upper or folding section of the lounge is provided with a mortise-seat, I, for the outer end *w* of the bolster to fasten into. A pin, N, may be put through the mortise to form a bearing for the said end *w* to rest under, so as to have an incline corresponding to the opposite end of the bolster.

In Fig. 1 the lounge is arranged for a bed, with bolster in position for use. To close the bolster, lift the end *w* out of the mortise and swing it around to the position shown by dotted lines M, and the upper section of lounge can be closed in the usual manner.

I am aware that detachable bolsters have been placed across the ends of an unfolded lounge, and that such bolsters are placed between the mattresses when the lounges are closed; and that inclined heads of the main frames of lounges have been provided with auxiliary heads pivoted to them, so as to open and form continuous head-pieces; but such I do not claim as my invention.

Having thus explained my invention, what I claim as new, and desire to secure by Letters Patent, is—

1. A folding lounge, provided with a swinging bolster, substantially as and for the purpose set forth.

2. The combination of the pivot R, cam T, bolster J, and the folding part B, having the seat I, as and for the purpose set forth.

Witnesses: HENRY S. CARTER.
L. M. ANGLE,
D. H. CLARKE.